(12) United States Patent
Mercurio

(10) Patent No.: US 10,464,495 B2
(45) Date of Patent: Nov. 5, 2019

(54) VEHICLE ROOF TOP CARGO CARRIER

(71) Applicant: James Ira Mercurio, Indianapolis, IN (US)

(72) Inventor: James Ira Mercurio, Indianapolis, IN (US)

( * ) Notice: Subject to any disclaimer, the term of this patent is extended or adjusted under 35 U.S.C. 154(b) by 0 days.

(21) Appl. No.: 16/114,069

(22) Filed: Aug. 27, 2018

(65) Prior Publication Data

US 2019/0009729 A1    Jan. 10, 2019

Related U.S. Application Data

(63) Continuation-in-part of application No. 15/597,853, filed on May 17, 2017, now Pat. No. 10,059,273.

(51) Int. Cl.
*B60R 9/00* (2006.01)
*B60R 9/042* (2006.01)
*B60R 9/045* (2006.01)
*B60R 9/08* (2006.01)

(52) U.S. Cl.
CPC .............. *B60R 9/042* (2013.01); *B60R 9/045* (2013.01); *B60R 9/08* (2013.01)

(58) Field of Classification Search
CPC ............ B60R 9/042; B60R 9/045; B60R 9/08
USPC ....................................................... 224/310
See application file for complete search history.

(56) References Cited

U.S. PATENT DOCUMENTS

| | | |
|---|---|---|
| 3,048,291 A | 8/1962 | Mabry |
| 3,128,893 A | 4/1964 | Jones |
| 3,170,583 A | 2/1965 | Meyer |
| 3,193,124 A | 7/1965 | Essling |
| 3,343,696 A | 9/1967 | Morrison |
| 3,411,644 A | 11/1968 | Cook |
| 3,460,693 A | 8/1969 | Oldham |
| 3,550,800 A | 12/1970 | Robinson |
| 3,648,866 A | 3/1972 | Sloan |
| 3,708,081 A | 1/1973 | Schladenhauffen |
| 3,732,998 A | 5/1973 | Martin |
| 3,840,133 A | 10/1974 | Berg |
| 3,843,002 A | 10/1974 | Pihlgren |
| 3,871,540 A | 3/1975 | Jenkins |
| 3,872,989 A | 3/1975 | Smithson et al. |

(Continued)

FOREIGN PATENT DOCUMENTS

EP    2551151 B1    12/2016

*Primary Examiner* — Peter N Helvey
(74) *Attorney, Agent, or Firm* — Bruce J. Bowman

(57) ABSTRACT

A vehicle roof top cargo carrier provides pivoting loading/ unloading of all types of cargo to and from the carrier via the rear of a vehicle, and, once extended, provides use as a stand/frame for purposes other than carrying cargo. The vehicle roof top cargo carrier has a frame attachable to existing rack members on the roof of the vehicle, a carriage movably carried on the frame and able to pivot with respect to the frame once the carriage is extended from the rear of the frame via cooperating pivot structures of the carriage and the frame. The cooperating pivot structures allow the carriage to pivot from 0° (horizontal) to 90° (vertical), and a support retained on the carriage and configured to adjustably telescope from the rear of the carriage for contacting the ground. The carriage has cargo receptacles for accommodating various types of cargo, and purpose specific attachments for non-cargo functions.

11 Claims, 17 Drawing Sheets

(56) References Cited

U.S. PATENT DOCUMENTS

| | | | |
|---|---|---|---|
| 3,877,594 A | 4/1975 | Coakley | |
| 3,894,643 A | 7/1975 | Wilson | |
| 3,927,779 A | 12/1975 | Johnson | |
| 4,058,243 A | 11/1977 | Tappan | |
| 4,081,095 A * | 3/1978 | Wilburn | B60R 9/042 414/462 |
| 4,212,580 A | 7/1980 | Fluck | |
| 4,234,285 A | 11/1980 | Martinez | |
| 4,269,561 A | 5/1981 | Rutten | |
| 4,420,165 A | 12/1983 | Goodin | |
| 4,531,879 A | 7/1985 | Horowitz | |
| 5,069,595 A | 12/1991 | Smith et al. | |
| 5,108,248 A | 4/1992 | Murrill | |
| 5,123,799 A | 6/1992 | Breazeale | |
| 5,447,408 A | 9/1995 | Smith | |
| 5,505,579 A | 4/1996 | Ray et al. | |
| 5,511,928 A * | 4/1996 | Ellis | B60P 3/1025 114/344 |
| 5,690,259 A * | 11/1997 | Montani | B60R 9/042 224/310 |
| 5,904,463 A * | 5/1999 | Christensen | B60R 9/042 224/310 |
| 5,921,741 A | 7/1999 | Heimgartner | |
| 6,516,984 B1 * | 2/2003 | Kmita | B60R 9/042 224/309 |
| 6,739,823 B2 | 5/2004 | Shirvell | |
| 8,245,893 B2 | 8/2012 | Sautter et al. | |
| 8,376,684 B2 | 2/2013 | Juarez-Ortega | |
| 8,733,604 B2 | 5/2014 | Murray et al. | |
| 9,346,409 B2 * | 5/2016 | Pfaeffli | B60R 9/045 |
| 9,758,106 B2 * | 9/2017 | Zimmer | B60R 9/042 |
| 10,017,096 B1 * | 7/2018 | Helmick | B60P 3/1066 |
| 10,059,273 B1 * | 8/2018 | Mercurio | B60R 9/042 |
| 2008/0193265 A1 * | 8/2008 | Sautter | B60R 9/042 414/462 |
| 2013/0248567 A1 | 9/2013 | Townsend | |

\* cited by examiner

VEHICLE ROOF TOP CARGO CARRIER

CROSS-REFERENCE TO RELATED APPLICATIONS

This U.S. non-provisional patent application is a continuation-in-part of co-pending U.S. non-provisional patent application Ser. No. 15/597,853 filed May 17, 2017 titled "Vehicle Roof Top Cargo Carrier" issued Aug. 28, 2018 as U.S. Pat. No. 10,059,273, the entire contents of which is specifically incorporated herein by reference.

FIELD OF THE INVENTION

The present invention relates to vehicle roof top carriers and, more particularly, to automobile roof top carriers providing easy loading and unloading of a variety of cargo.

BACKGROUND OF THE INVENTION

The roof of a vehicle is a convenient way to stow, hold and transport cargo that is too large, bulky, or unable to fit inside the vehicle, or is otherwise inconvenient for interior vehicle storage. Accordingly, various holders, racks, carriers and the like (collectively, carriers) have been devised for stowing and transporting cargo on the roof of a vehicle. Some carriers are for general purpose while other carriers are for particular purposes such as boats, recreational equipment, camping equipment, bicycles, kayaks, SUPs, and the like.

These prior art vehicle roof top carriers suffer generally from various issues that make them impractical, unwieldy, difficult, and/or clumsy to use. Static vehicle roof top carriers make the user hoist the cargo to the roof for loading it onto the roof top carrier. Heavy cargo thus makes loading and unloading difficult if not dangerous. Because of these issues, various vehicle roof top cargo carriers have been devised having one or more components that can extend from the roof to allow loading and unloading onto the extended component(s). However, even these are disadvantageous. For instance, some vehicle roof top carriers permit loading and unloading only from the side of the vehicle. Depending on where or how the vehicle is parked, one may not be able to load or unload cargo from the side of the vehicle. Moreover, it may be difficult to put the extended portion back onto the roof once cargo has been loaded. Rear load versions use cables, springs or other generally cumbersome manners of receiving then stowing cargo. In still other instances, the vehicle roof top carriers are generally difficult or clumsy to mount, and/or cannot be easily removed, as some have a tall profile that cannot fit under normal overhangs of into garages.

In view of the above, it is an object of the present invention to provide an improved vehicle roof top cargo carrier that is easy to load and unload for any size and/or weight of cargo. It is further an object of the present invention to provide a vehicle roof top cargo carrier that loads from the rear of the vehicle. It is yet further an object of the present invention to provide a vehicle roof top cargo carrier wherein a portion of the carrier may be removed to reduce the height of the carrier while leaving a frame of the carrier attached to the existing roof rack members of the vehicle. It is still further an object of the present invention to provide a roof top cargo carrier whose cargo holder is pivotal from a horizontal (0°) position to a vertical (90°) position, once the cargo holder is extended from the frame. It is yet further an object of the present invention to provide a versatile roof top cargo carrier that, once pivotally extended into an appropriate configuration, can be used for functions other than holding cargo. Other objects are contemplated and expected.

SUMMARY OF THE INVENTION

A vehicle roof top cargo carrier, for use with all types of cargo, attaches to existing roof rack members of the vehicle, provides pivoting loading and unloading of cargo to and from the carrier via the rear of the vehicle, and whose height is reducible by removal of a portion of the carrier.

The vehicle root top cargo carrier has a cargo holding carriage that is movably received in a frame that is attached to the roof of the vehicle. The carriage pivots with respect to the frame once the carriage has been movably extended from the frame. A support is extendable from the carriage to accommodate height issues, and preferably, but not necessarily, pivots with respect to the carriage to accommodate various configurations/uses.

The vehicle roof top cargo carrier has a frame that is attached to existing, typically factory-installed, rack members on the roof of a vehicle, a carriage movably supported on the frame and configured to pivot from a generally horizontal (0°) [i.e. generally co-planar with the roof of the vehicle] position to a generally vertical (90°) [i.e. generally perpendicular to the roof of the vehicle] position with respect to the frame once the carriage has been extended from the rear of the frame (vehicle), pivoting made possible by pivot structures on the frame and on the carriage, such as, but not limited to, one or more pivot rods at the front of the carriage that are received in one or more pivot brackets at the rear of the frame, and a support movably retained on the rear of the carriage and configured to adjust from and relative to the rear of the carriage in order to contact the ground regardless of the position of the carriage, the support configured to move from a generally horizontal (0°) [i.e. generally co-planar with the carriage] position to a generally vertical (90°) [i.e. generally perpendicular to the carriage] position with respect to the carriage once the support has been extended from the rear of the carriage. Cargo receptacles are secured to the carriage for holding the cargo, and can be changed to accommodate various types of cargo. The carriage is easily removable from the frame, while the support is easily removable from the carriage.

In one form, the frame has a first elongated lateral rail and a second elongated lateral rail, the first and second elongated lateral rails connected to one another by cross members. The first elongated lateral rail defines a first elongated open pathway for the carriage, while the second elongated lateral rail defines a second elongated open pathway for the carriage. One or more attachment members are provided on the first lateral rail that allow securement to existing roof rack members of the vehicle. Likewise, one or more attachment members are provided on the second lateral rail that allow securement to the existing roof rack members of the vehicle. A first pivot bracket is situated at the rear of the first elongated lateral rail that provides a first pivot seat for the carriage. Likewise, a second pivot bracket is situated at the rear of the second elongated lateral rail that provides a second pivot seat for the carriage.

A first outwardly flared guide is preferably, but not necessarily, provided at the rear of the first pivot bracket adjacent an opening to the first elongated pathway that directs a side of the carriage into the first elongated railway. A second outwardly flared guide is preferably, but not necessarily, provided at the rear of the second pivot bracket adjacent an opening to the second elongated pathway that directs a side of the carriage into the second elongated railway. Additionally, the frame preferably, but not necessarily, includes a first stop provided at a front side of the first elongated lateral rail, and a second stop provided at a front side of the second elongated lateral rail. The first and second stops limit forward travel of the carriage by interacting with respective first and second pivot rods at the front of the carriage.

In another form, the frame is preferably, but not necessarily, one piece, defining a front, a rear, a first lateral side, a second lateral side, a first channel at or proximate to the first lateral side of the frame and extending generally from the front of the frame to the rear of the frame, a second channel at or proximate to the second lateral side of the frame and extending generally from the front of the frame to the rear of the frame, the second lateral side opposite the first lateral side, a first pivot structure at the rear of the frame proximate to and/or in the first channel, and a second pivot structure at the rear of the frame proximate to and/or in the second channel. The front of the frame may further include a combination air deflector and carriage stop.

In one form, the carriage has a first elongated side member and a second elongated side member connected to each other via cross members. One or more axles are provided between and supported by the first and second elongated side members and situated proximate the front of the carriage, while one or more axles are provided between and supported by the first and second elongated side members and situated proximate the rear of the carriage. Each axle extends through and projects slightly beyond the first and second elongated side members, the projected axles each supporting a wheel on the outside of the first and second elongated side members. The wheels ride on the first and second elongated pathways of the frame such that the carriage is movably supported on the frame. First and second housings are supported on rear cross members of the carriage and are configured to slidably hold the support.

The pivot structure of the carriage may comprise a first pivot rod situated at the front of the first elongated side member and a second pivot rod situated at the front of the second elongated side member. The first pivot rod is received by the first pivot bracket, and the second pivot rod is received by the second pivot bracket when the carriage is fully extended from the frame to allow the carriage to pivot down and up from the rear of the frame for loading and unloading cargo. Other pivot structures are contemplated.

In another form, the pivot structure of the carriage may comprise a single rod, bar, shaft, dowel, or the like at the front of the carriage and extending from one side of the carriage to the opposite side of the carriage. Other pivot structures are contemplated.

In another form, the carriage is preferably, but not necessarily, one piece, defining a front, a rear, a first lateral side, a second lateral side, first conveyance members at the first lateral side of the carriage, and second conveyance members at the second lateral side of the carriage, the carriage sized for movable reception within the frame. The first and second conveyance members preferably, but not necessarily, comprise wheels. However, other types of conveyance members may be used. The carriage has a single pivot structure (rod) at the front of the carriage. The rear of the carriage has brackets or the like that hold the support. The brackets allow the support to adjustably move with respect to the brackets/carriage, and to allow the support to pivot relative to the carriage from 0° to 90°. The carriage also has removable supports that hold/carries various cargo.

In one form, the support has a first leg that is slidably retained in a first bracket of the carriage, a second leg that is slidably retained in a second bracket of the carriage, and a transverse bar situated at the ends of the first and second legs. The first bracket and the first leg each have a plurality of holes that accept a removable pin in order to fix the first leg relative to the first housing. Likewise, the second bracket and the second leg each have a plurality of holes that accept a removable pin in order to fix the second leg relative to the second housing. By sliding the first and second legs in and out of the respective first and second brackets, the length of the support relative to the end of the carriage can be set. In this manner, the support can thus be in a retracted position relative to the carriage and any number of extended positions relative to the carriage in order to allow the cross bar to reach the ground when the carriage has been extended and pivoted relative to the frame for loading of cargo. This is especially handy when the support is at the 90° position—particularly when it is being used for a purpose other than carrying cargo.

Different cargo receptacles may be connected to the carriage for holding various cargo.

In another form, the present vehicle roof top cargo holder has a frame and a carriage that supports the cargo. The frame is configured for attachment to the roof of a vehicle while the carriage is movably received in the frame and supports one or more cargo holders and/or attachments allowing use of the vehicle roof top cargo holder for functions other than stowing/carrying cargo. The carriage is pivotal from a horizontal (0°) position to a vertical (90°) position relative to the frame once the carriage is extended from the frame. The present cargo carrier provides a versatile roof top cargo carrier that, once pivotally extended into an appropriate configuration, can be used for functions other than holding cargo.

Further aspects of the present invention will become apparent from consideration of the drawings and the following description of a form of the invention. A person skilled in the art will realize that other forms of the invention are possible and that the details of the invention can be modified in a number of respects without departing from the inventive concept. The following drawings and description are to be regarded as illustrative in nature and not restrictive.

BRIEF DESCRIPTION OF THE DRAWINGS

The features of the invention will be better understood by reference to the accompanying drawings which illustrate the present invention, wherein.

Like reference numerals indicate the same or similar parts throughout the several figures.

A description of the features, functions and/or configuration of the components depicted in the various figures will now be presented. It should be appreciated that not all of the features of the components of the figures are necessarily described. Some of these non-discussed features, if any, as well as discussed features are inherent from the figures. Other non-discussed features may be inherent in component geometry and/or configuration.

DETAILED DESCRIPTION OF THE INVENTION

Figure 1:
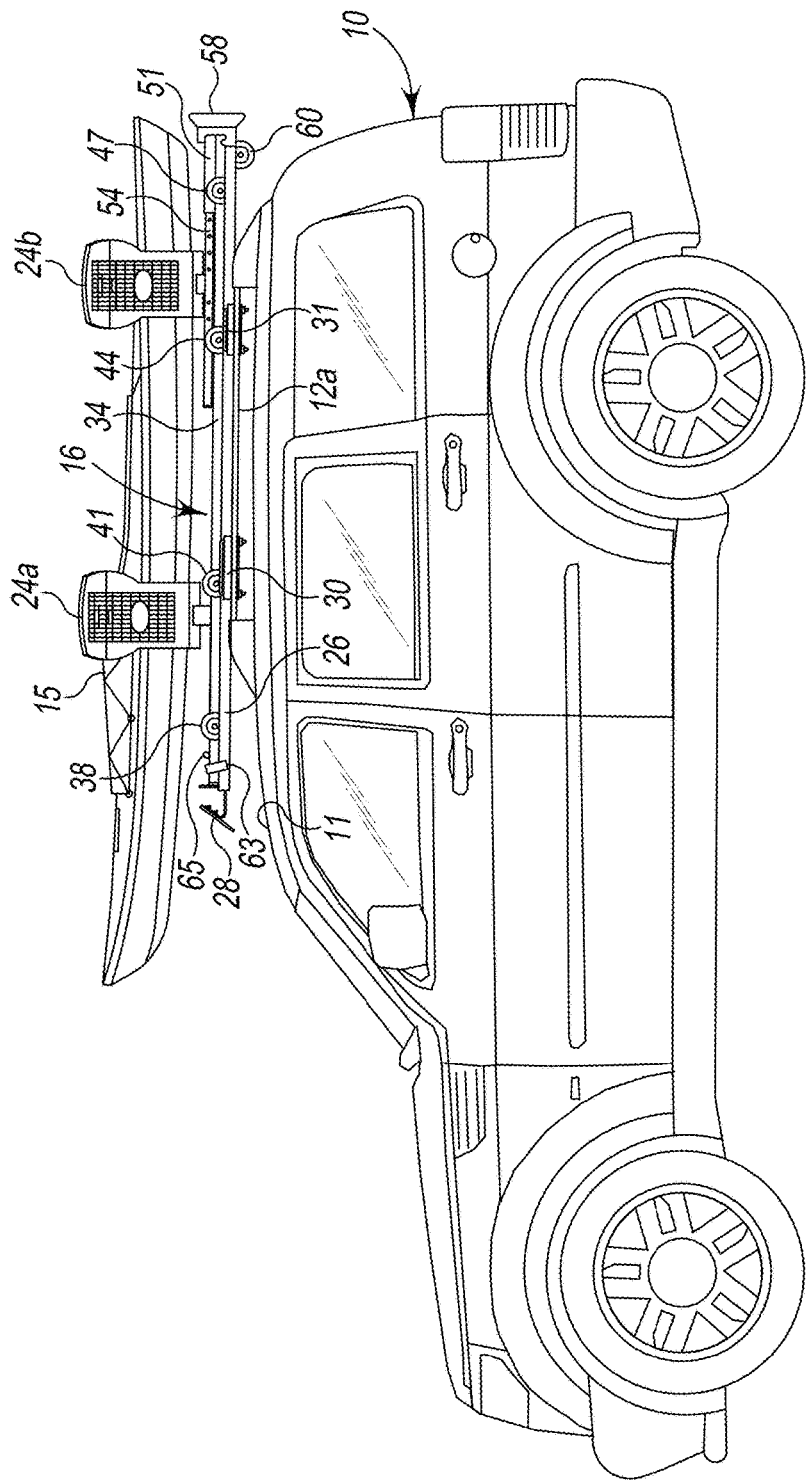
FIG. 1 is a side view of a typical vehicle having an existing roof rack with a roof top cargo carrier fashioned in accordance with the principles of the present invention, the roof top cargo carrier shown carrying a kayak in its front and rear cargo receptacles.
Figure 2:
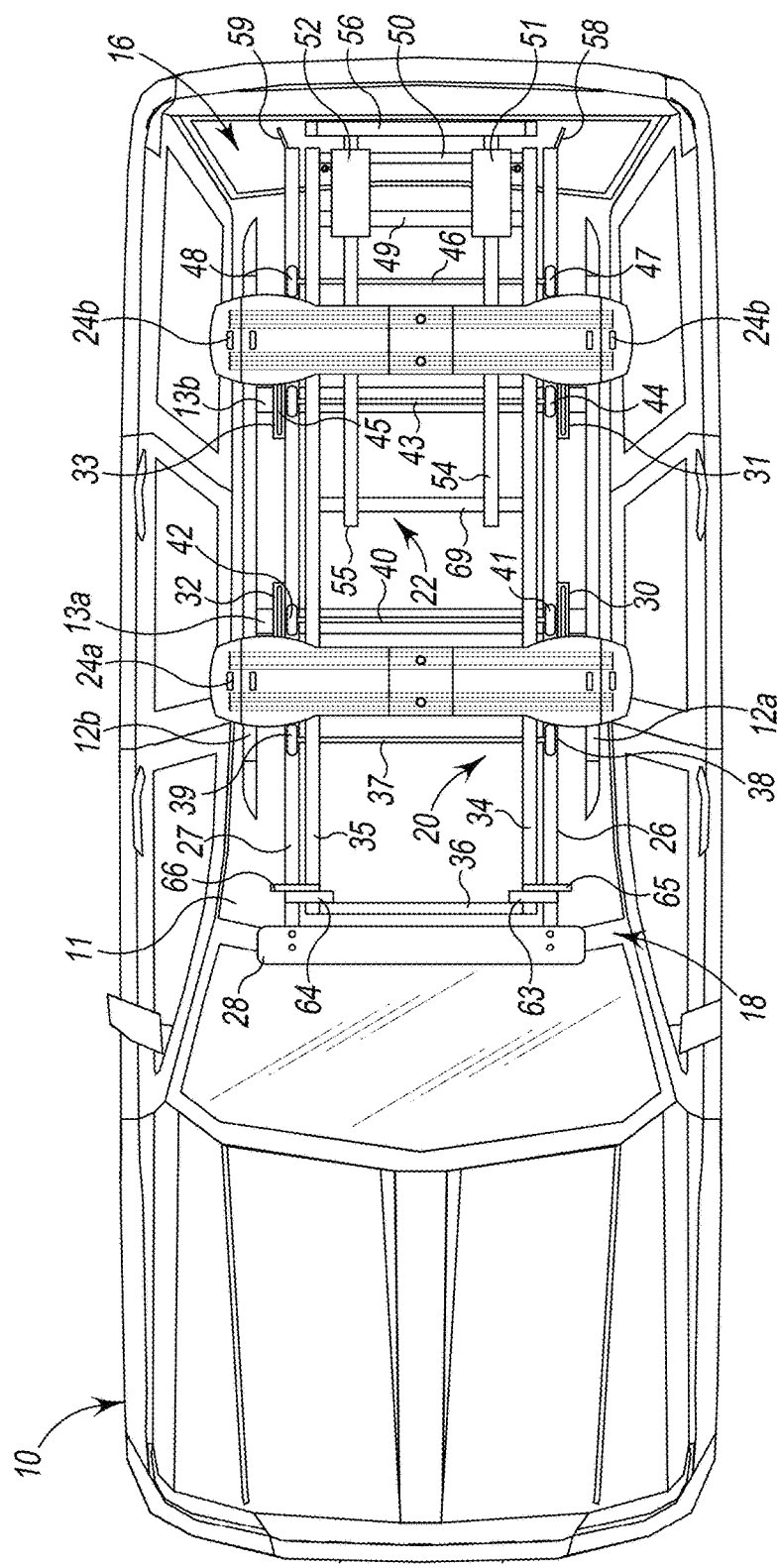
FIG. 2 is a top plan view of the vehicle having the present roof top cargo carrier in a stowed or non-extended position and without carrying cargo.

Referring to FIG. 1, there is depicted a side view of an exemplary vehicle, shown as a typical SUV 10, having typical factory installed (existing) roof rack such as a driver's side and passenger's side longitudinal roof rack members 12a, 12b situated on the roof 11 of the vehicle 10, along with typical factory installed front and rear roof rack members 13a, 13b extending between and transverse to the transverse roof rack members 12a, 12b. A vehicle roof top cargo carrier 16, fashioned in accordance with the present principles, is also shown attached to the transverse front and rear roof rack members 13a, 13b, and supporting a kayak 15 as cargo in and/or on front and rear cargo receptors 24a, 24b. FIG. 2 shows a top view of the vehicle 10 with the present vehicle roof top cargo carrier 16 without cargo. FIGS. 3-11 show various views of the present vehicle roof top cargo carrier 16 without cargo and in various extended and non-extended states or positions as described more fully below. The present vehicle roof top cargo carrier may be attached to other members of the existing vehicle roof rack and/or at places other than shown.

The vehicle roof top cargo carrier 16 is characterized by a frame or outer frame 18 that is connected to the existing transverse front and rear roof rack members 13a, 13b of the vehicle 10, a carriage or inner frame 20 that is received by the frame 18 and movable with respect thereto, and a support or end frame 22 that is retained by and movable with respect to the carriage 20. As explained below, the carriage 20 is extendable from the rear of the frame 18 and thus the rear of the vehicle 10 to provide cargo loading/unloading onto/from the carriage 20 via the rear of the vehicle 10. The carriage 20 is then moved back into the frame 18. The support 22 is extendable from the rear of the carriage 20 in order to contact the ground and thus adjustably set the angle of the carriage 20 relative to the roof rear of the vehicle for loading and unloading of cargo.

The frame 18 has a first or driver's side elongated lateral rail 26 and a second or passenger's side elongated lateral rail 27, the nomenclature first and second being arbitrary here and throughout. The first and second elongated lateral rails 26, 27 each has an "L" shape that defines respective first and second open railways, of which the second open railway 90 is particularly seen in FIG. 7, with the first open railway be identical but opposite thereto. The first open railway defined by the first elongated lateral rail 26 of the frame 18 receives wheels 38, 41, 44, 47, of the carriage 20, while the second elongated lateral rail 27 of the frame 18 receives wheels 39, 42, 45, 48, of the carriage 20 to allow the carriage 20 to be movable along and with respect to the frame 18. A header 28 is connected at and to the front of the first and second elongated lateral rails 26, 27 for frame stability. The header 28 is also configured to provide air deflection over the vehicle roof top cargo carrier 16.

Figure 3:
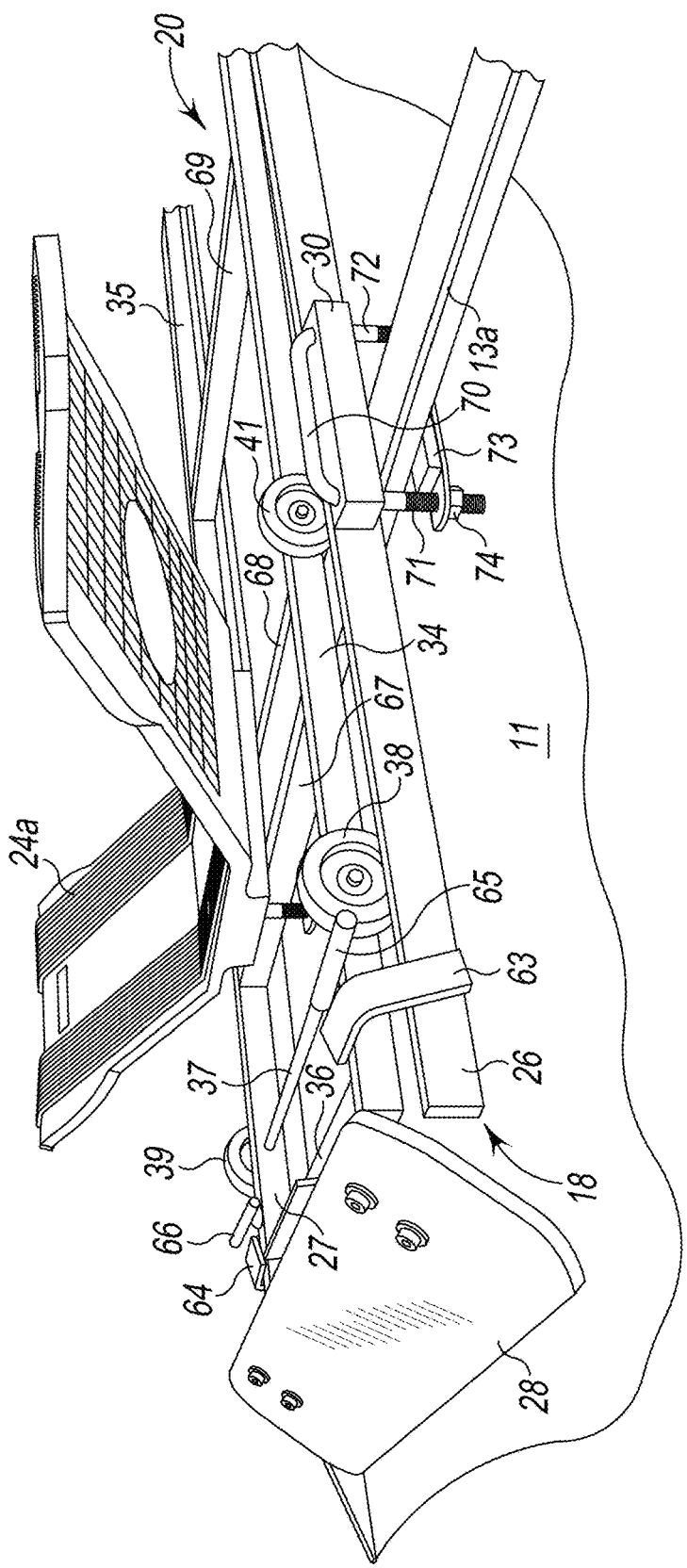
FIG. 3 is an enlarged view of a front portion of the present roof top cargo carrier attached onto the roof of the vehicle, the roof top cargo carrier in a stowed position or non-extended position without carrying cargo.
Figure 4:
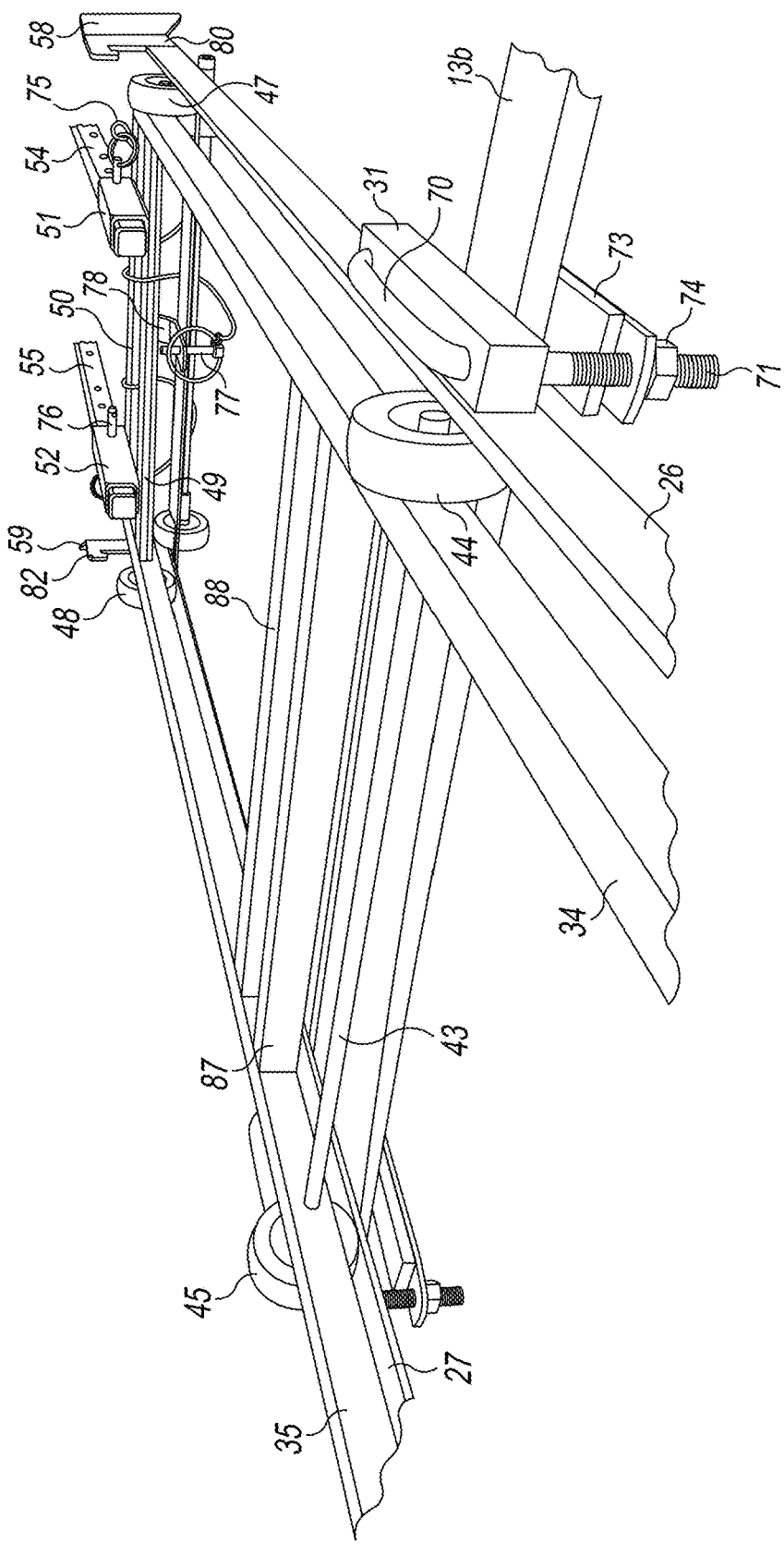
FIG. 4 is an enlarged view of a middle portion of the present roof top cargo carrier attached onto the roof of the vehicle, the roof top cargo carrier in a stowed or non-extended position without cargo and shown without a front cargo receptacle.

The first elongated lateral rail 26 has a first or front boss 30 situated on the outside thereof and a second or rear boss 31 likewise situated on the outside thereof. The first and second bosses 30, 31 allow attachment of the first elongated lateral rail 26 to the existing roof rack members of the vehicle. Particularly, and as best seen in FIG. 3, the first boss 30 is situated over the transverse front roof rack member 13a and has bores to receive first and second threaded legs 71, 72 of a U-bolt 70. A plate 73 is provided under the transverse front roof rack member 13a that receives the first and second threaded legs 71, 72 of the U-bolt 70. Nuts 74 are threaded onto the first and second threaded legs 71, 72 to clamp the plate 73 against the underside of the transverse front roof rack member 13a while the U-bolt 70 compresses down on the boss 30 for securement to the transverse front roof rack member 13a. Likewise, and as best seen in FIG. 4, the second boss 31 is situated over the transverse rear roof rack member 13b and has bores to receive first and second threaded legs 71, 72 of a U-bolt 70. A plate 73 is provided under the transverse rear roof rack member 13b that receives the first and second threaded legs 71, 72 of the U-bolt 70. Nuts 74 are threaded onto the first and second threaded legs 71, 72 to clamp the plate 73 against the underside of the transverse rear roof rack member 13b while the U-bolt 70 compresses down on the boss 31 for securement to the transverse rear roof rack member 13b.

The second elongated lateral rail 27 also has a first or front boss 32 situated on the outside thereof and a second or rear boss 33 likewise situated on the outside thereof. The first and second bosses 32, 33 allow attachment of the second elongated lateral rail 27 to the existing roof rack members of the vehicle in the same manner as described above with respect to the first elongated lateral rail 26.

Figure 6:
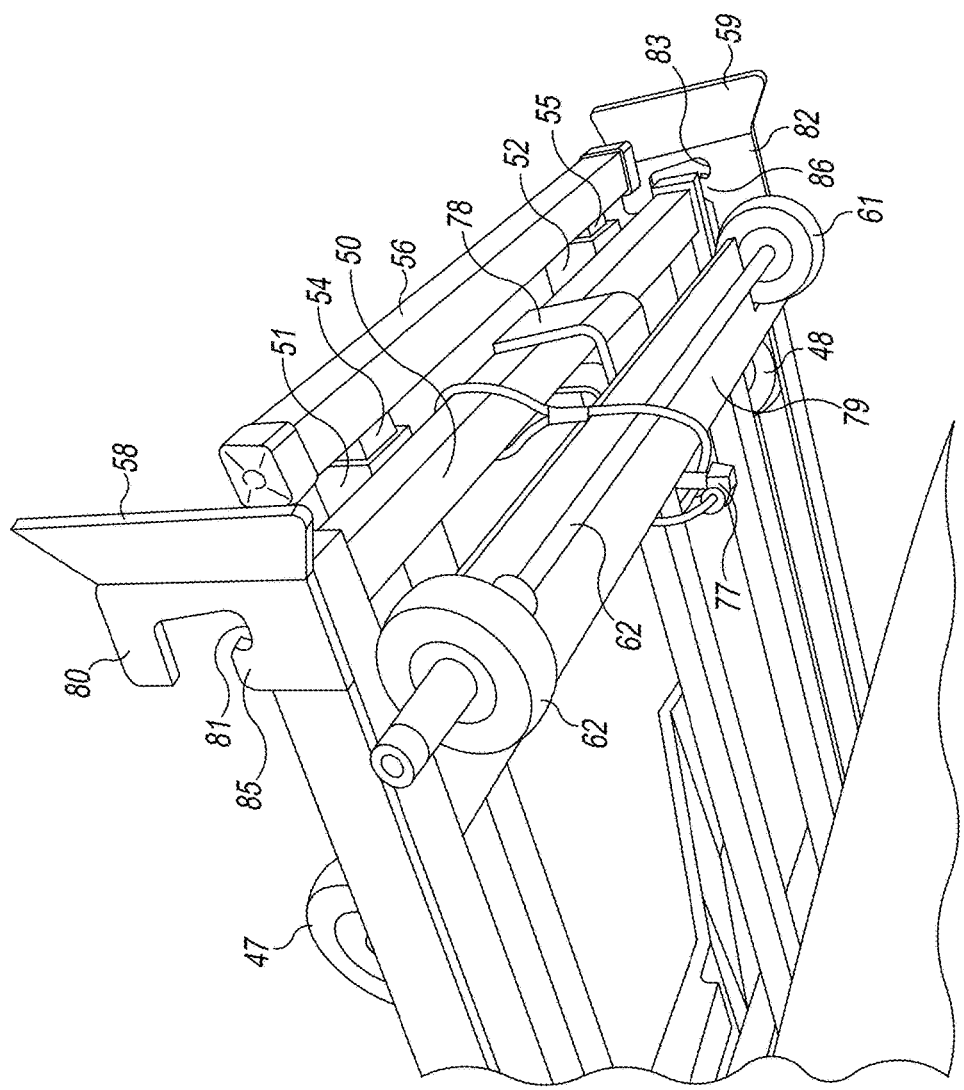
FIG. 6 is an enlarged view of an end portion of the present roof top cargo carrier attached onto the roof of the vehicle, the roof top cargo carrier without cargo and shown in a stowed or non-extended position.

The first elongated lateral rail 26 further includes a first pivot bracket 80 situated at the rear thereof, with the second elongated lateral rail 27 also further including a second pivot bracket 82 at the rear thereof. As best seen in FIG. 6, the first pivot bracket has a cutout 81 defining a first pivot seat for a first pivot rod 65 of the carriage 20. The cutout 81 is configured with a flange 85 that defines a raised catch for the first pivot rod 65 of the carriage 20, the operation of which is described more fully below. Likewise, the second pivot bracket 82 has a cutout 83 defining a second pivot seat for a second pivot rod 66 of the carriage 20. The cutout 83 is configured with a flange 86 that defines a raised catch for the second pivot rod 66 of the carriage 20, the operation of which is described more fully below.

The frame 18 moreover includes a rear cross bar 79 (see, e.g. FIGS. 6 and 8) that extends between and connects with the rear of the first elongated lateral rail 26 and the rear of the second elongated lateral rail 27. An axle 62 is retained under and extends along the rear cross bar 79. The axle 62 rotatably supports first and second wheels 61 and 62. As described more fully below, the first and second wheels 61, 62 aid in extending, pivoting, and retracting the carriage 20 relative to the frame 18. A first outwardly flared guide 58 is provided at the rear end of the first pivot bracket 80, while a second outwardly flared guide 59 is provided at the rear end of the second pivot bracket 82. The first and second outwardly flared guides 58, 59 provide guidance for the right and left side wheels of the carriage 20 into the first and second railways of the frame 18 (see e.g. FIG. 7 which shows the second railway 90).

Additionally, and as best seen in FIGS. 2 and 3, a first stop 63 is provided at the front of the first elongated lateral side rail 26, while a second stop 64 is provided at the front of the second elongated lateral side rail 27. The first stop 63 extends up and laterally inwardly from the first elongated lateral side rail 26. The second stop 64 extends up and laterally inwardly from the second elongated lateral side rail 27. As described more fully below, the first and second stops 63, 64 cooperate with the first and second pivot rods 65, 66 of the carriage 20 to stop forward travel of the carriage 20 within the frame 18.

Figure 9:
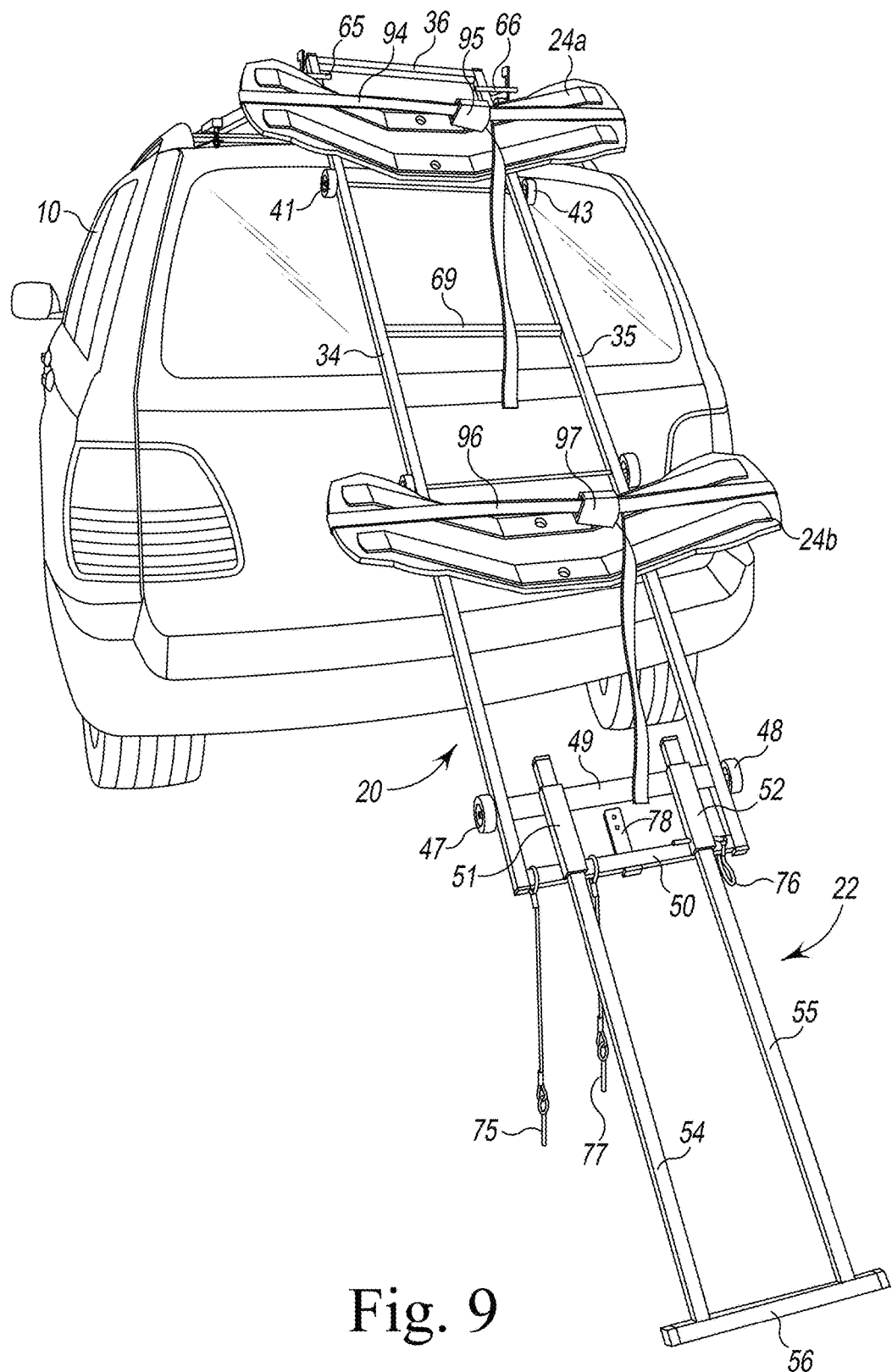
FIG. 9 is a view of the rear of the vehicle with the present roof top cargo carrier attached onto the roof of the vehicle with the carriage and support thereof in a fully extended position ready for cargo loading.
Figure 10:
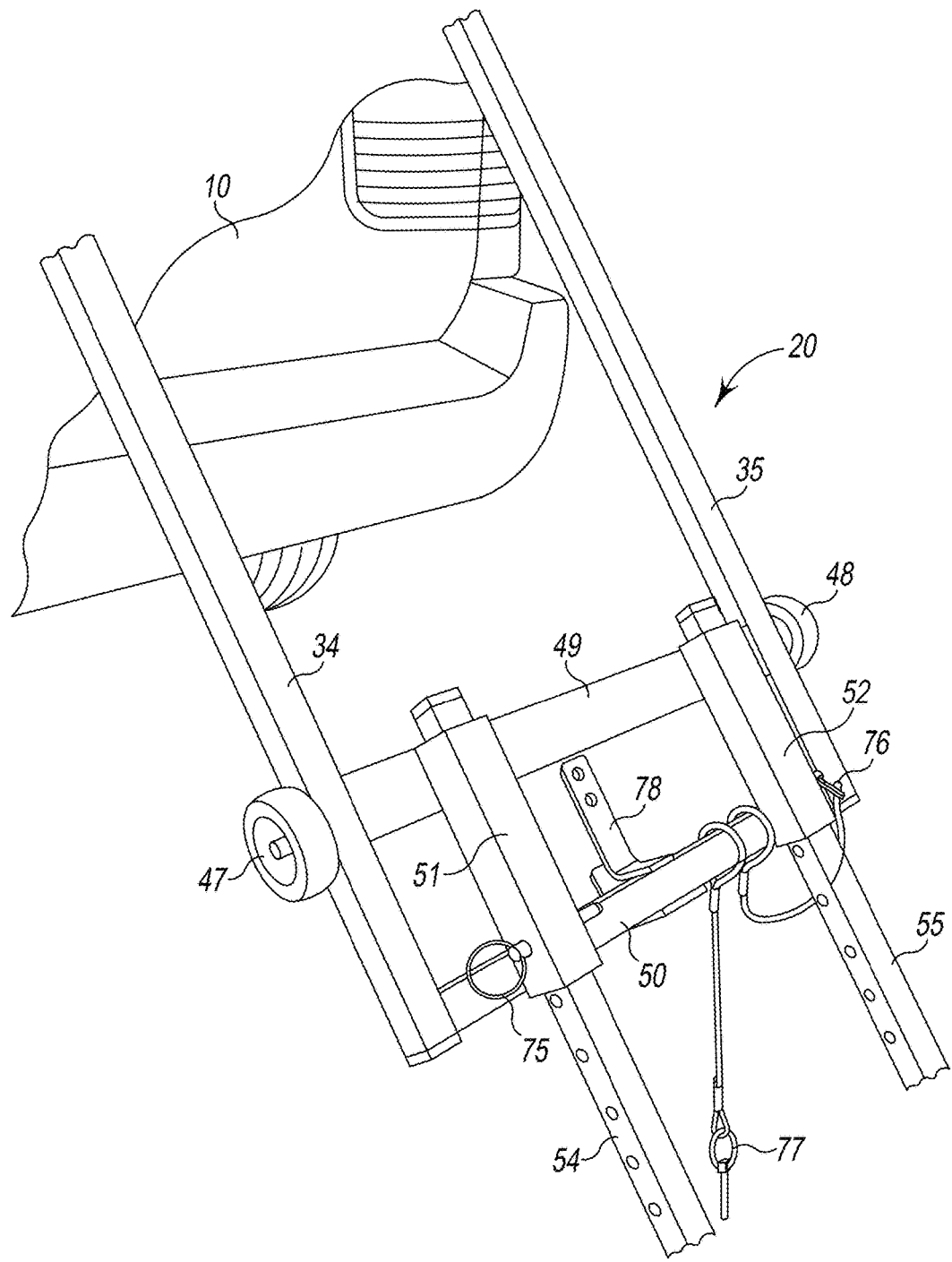
FIG. 10 is an enlarged view of a portion of the fully extended position of the present roof top cargo carrier as shown in FIG. 9.

The carriage 22 has a first elongated side member 34 and a second elongated side member 35 connected to each other by a front cross member 36, first and second middle front cross members 67, 68 (see, e.g. FIG. 3), a middle cross member 69, a first and second middle rear cross members 87, 88 (see, e.g. FIG. 4) and first and second rear cross members 49, 50 (see, e.g. FIGS. 9 and 10). A first axle 37 is provided through and between the first and second elongated side members 34, 36 between the front cross member 36 and the first middle front cross member 67. The first axle 37 rotatably supports a wheel 38 laterally outside of the first elongated side member 34 and a wheel 39 laterally outside of the second elongated side member 36. A second axle 40 is provided through and between the first and second elongated side members 34, 36 between the second middle front cross member 68 and the middle cross member 69. The second axle 40 rotatably supports a wheel 41 laterally outside of the first elongated side member 34 and a wheel 42 laterally outside of the second elongated side member 36. A third axle 43 is provided through and between the first and second elongated side members 34, 36 between the middle cross member 69 and the first middle rear cross member 87. The third axle 43 rotatably supports a wheel 44 laterally outside of the first elongated side member 34 and a wheel 45 laterally outside of the second elongated side member 36. A fourth axle 46 is provided through and between the first and second elongated side members 34, 36 between the second middle rear cross member 88 and the first rear cross member 49. The fourth axle 46 rotatably supports a wheel 47 laterally outside of the first elongated side member 34 and a wheel 48 laterally outside of the second elongated side member 36.

The wheels 38, 41, 44 and 47 ride on the railway of the first elongated lateral rail 26 while the wheels 39, 42, 45 and 48 ride on the railway of the second elongated lateral rail 27 such that the carriage 20 is freely movable along and with respect to the frame 18. The carriage 20 is also not connected to the frame 18 so that the carriage 20 can be removed from the frame 18.

The first pivot rod 65 extends laterally outward from a front portion of the first elongated side member 34 while the second pivot rod 66 extends laterally outward from a front portion of the second elongated side member 35. In addition to cooperating with the first and second pivot brackets 80, 82 of the frame to form a pivot for the carriage 20 with respect to the frame 18, the first and second pivot rods 65, 66 abut the first and second stops 63, 64 of the first and second elongated lateral rails 26, 27 when the front of the carriage 20 is at the front of the frame 18, thus stopping further forward travel of the carriage 20 with respect to the frame 18.

The carriage 20 further has a first housing 51 situated on a lateral side of the first and second rear cross members 49, 50 and a second housing 52 situated the other lateral side of the first and second rear cross members 49, 50. The first housing 51 has a channel extending from the front of the housing 51 to the rear of the housing 51, and a bore extending through both sides of the housing 51 transverse to the channel, the bore sized to receive a first housing pin 75, the purpose of which is explained below. The second housing 52 likewise has a channel extending from the front of the housing 52 to the rear of the housing 52, and a bore extending through both sides of the housing 52 transverse to the channel, the bore sized to receive a second housing pin 76, the purpose of which is explained below.

Figure 5:
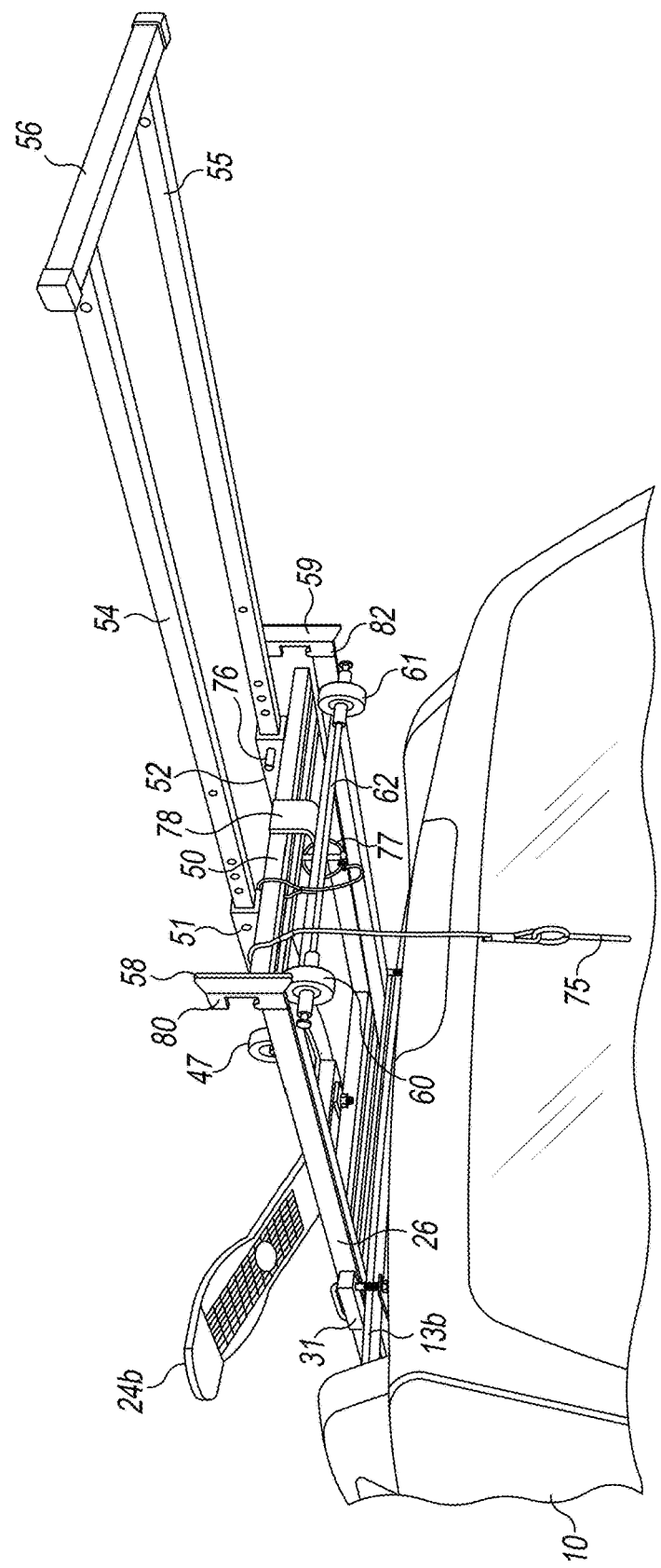
FIG. 5 is a view of a rear portion of the present roof top cargo carrier attached onto the vehicle, the roof top cargo carrier without cargo and shown in a partially extended position.
Figure 7:
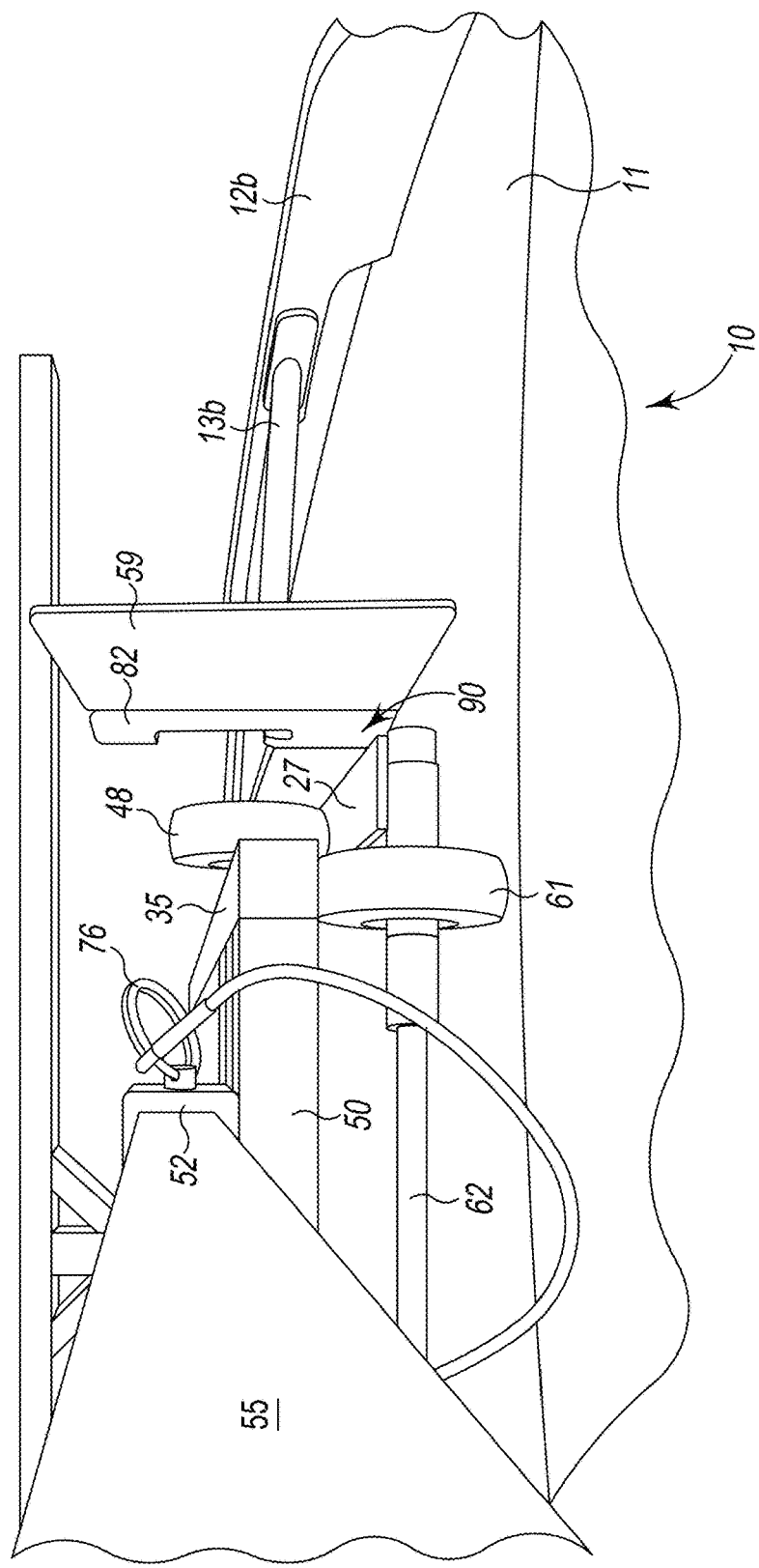
FIG. 7 is an enlarged view from the rear of the vehicle of one side of the end of the present roof top cargo carrier attached onto the roof of the vehicle, the roof top cargo carrier with the support thereof in a partially extended position.
Figure 8:
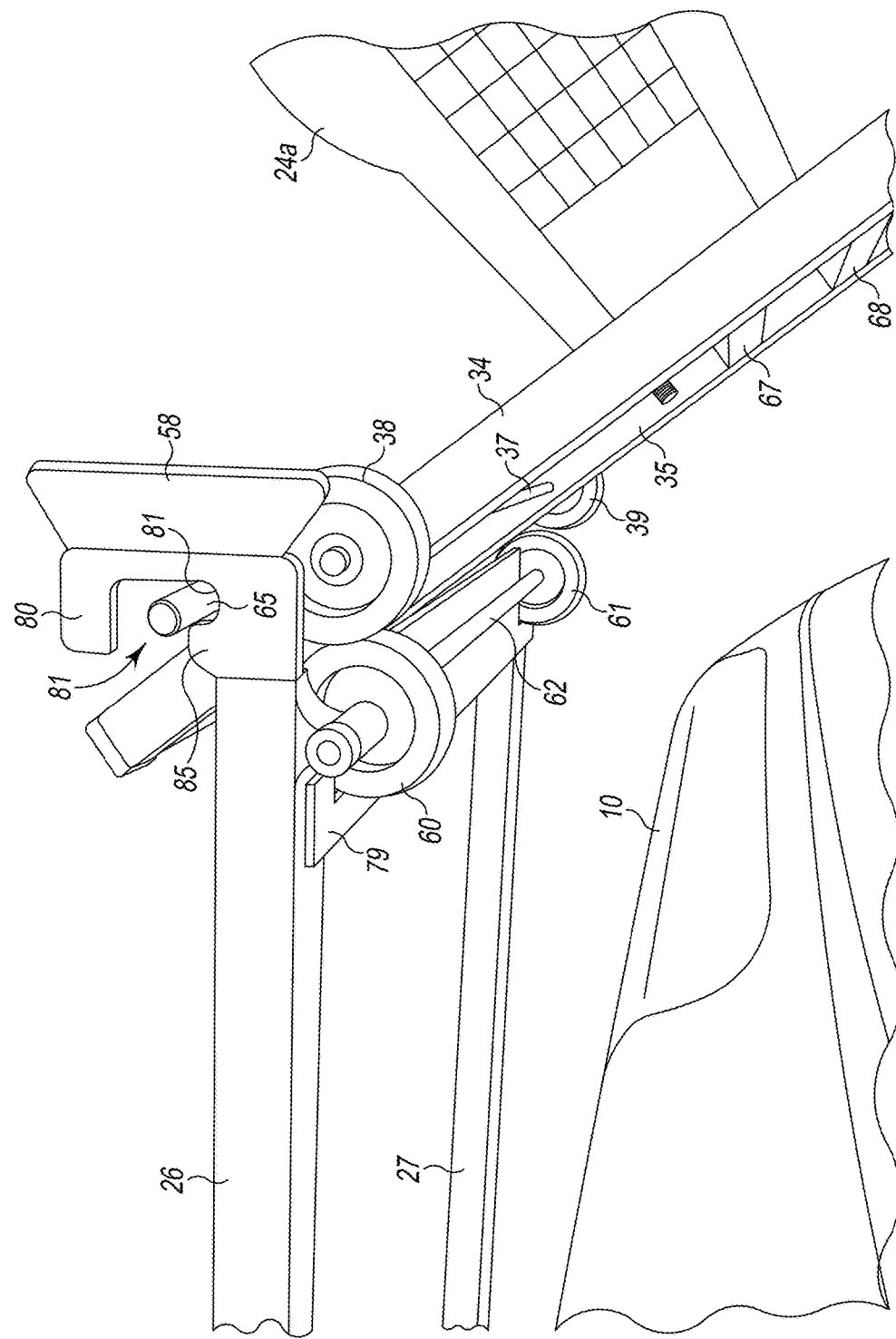
FIG. 8 is an enlarged view of the end of the vehicle with the present roof top cargo carrier attached onto the roof of the vehicle, the movable carriage thereof in an extended and pivoted position.

The support 22 has a first leg 54 with a plurality of through holes, and a second leg 55 also with a plurality of through holes. A transverse member 56 is provided at and between the ends of the first and second legs 54, 55. The first leg 54 is slidably received in the first housing 51 of the carriage 20, while the second leg 55 is slidably received in the second housing 52 of the carriage 20 such that the support 22 may be extended and retracted relative to the carriage 20. The first housing pin 75 is used to fix the first leg 54 in and relative to the first housing 51, while the second housing pin 76 is used to fix the second leg 55 in and relative to the second housing 52. The length of extension of the support 22 relative to the carriage 20 is controlled by sliding the first and second legs 54, 55 relative to the first and second housings 51, 52. In FIGS. 2 and 6 for example, the support 22 and thus the first and second legs 54, 55 are fully retracted relative to the carriage 20. In FIGS. 4, 5, 9 and 10, the support 22 and thus the first and second legs 54, 55 are full extended relative to the carriage. FIG. 4 depicts the first housing pin 75 extending through the bore of the first housing 51 and one set of through holes of the first leg 54 to fix the first leg 54 relative to the first housing 51. Likewise, the second housing pin 76 extends through the bore of the second housing and one set of through holes of the second leg 55 to fix the second leg 55 relative to the second housing 52. FIG. 5 depicts the support 22 fully extended from the carriage 20 and ready for fixing (locking) or releasing (unlocking) the support 22 relative to the carriage 20, with the first housing pin 75 removed from the first housing 51 and the second housing pin 76 in the housing 52. Both of the housing pins 75, 76 are preferably, but not necessarily, tethered or otherwise connected to the carriage 20. FIG. 7 shows the second housing pin 76 received in the second housing 52 and tethered or otherwise connected to the carriage 20. FIG. 9 shows the support 22 fully extended from the carriage 20 with the tethered first housing pin 75 removed from the first housing 51 and the tethered second housing pin 76 in the second housing 52. FIG. 10 shows both tethered housing pins 75, 76 in their respective first and second housing and thus fixing the first and second legs 54, 55 from sliding relative to the first and second housings.

As best seen in FIGS. 4-6 and 9-10, the carriage 20 includes an angle bracket 78 on the second rear end cross member 50. The angle bracket 78 has a plurality of holes (see FIGS. 9-10) that are sized to receive a carriage pin 77 that is preferably, but not necessarily, tethered or otherwise connected to the carriage 20. The carriage pin 77 fixes the angle bracket 78 to the rear of the frame 18. FIGS. 5 and 6 show the carriage pin 77 received by the frame 18 and angle bracket 78 to fix the carriage 20 to the frame 18. FIGS. 9 and 10 show the carriage pin 77 disengaged from the frame 18 and the angle bracket 78 because the carriage 20 is extended from the frame 18.

Figure 11:
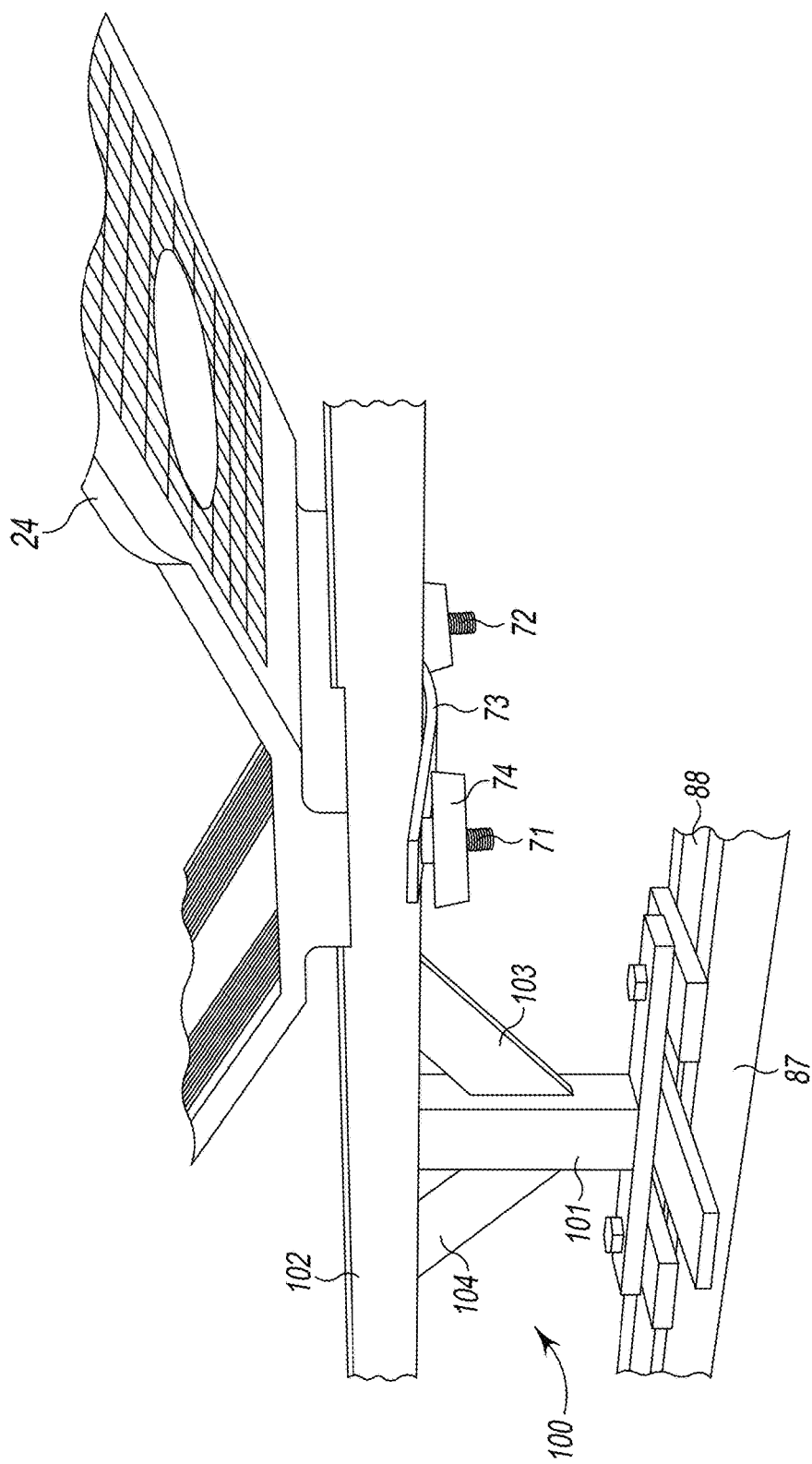
FIG. 11 is an enlarged view of a cargo receptacle for the present roof top cargo carrier.

As seen in various figures, the carriage 20 has first and second cargo receptacles 24a, 24b, the first cargo receptacle 24a connected onto the first and second front middle cross members 67, 68 of the carriage 20, and the second cargo receptacle connected onto the first and second rear middle cross members 87, 88 of the carriage. Note that FIG. 4 does not depict the second cargo receptacle 24b as is shown in other figures. It should be appreciated that the carriage 20 may have a single cargo receptacle or more than two cargo receptacles. Also, other styles and/or sizes of cargo receptacles may be used as desired or necessary for various types of cargo. The cargo receptacles 24a, 24b can hold a kayak 15 (as shown in FIG. 1) as well as other cargo. Referring to FIG. 11, a variation of a cargo holder that can be used with the present vehicle roof top cargo carrier 16 is shown. The cargo holder 100 includes a horizontal bar 102 supported by a stand 101 that is connected to cross members (cross members 87, 88 shown) of the carriage 20. Preferably, but not necessarily, the stand 101 is supported by first and second braces 103, 104. A cargo receptacle 24 may be attached to the bar 102. Alternately, just the bar 102 itself may be used as the cargo receptacle or holder, the cargo strapped to the bar 102 or otherwise secured thereto. Other cargo receptacles/holders are contemplated.

The present vehicle roof top cargo carrier 16 is shown in a stowed or fully retracted position in FIGS. 1 and 2 wherein the carriage 20 is fully forward with respect to the frame 18 and the support 22 is fully forward with respect to the carriage 20. In this position, the vehicle roof top cargo carrier 16 can securely carry or not carry cargo as desired. The carriage pin 77 is received in the angle bracket 78 through the rear of the frame 18 to fix movement of the carriage 20 relative to the frame 18. The first and second legs 54, 55 of the support 22 are fully forward with respect to the first and second housings 51, 52 with the first and second housing pins 75, 76 received in and through the respective first and second housings and respective first and second legs 54, 55.

For loading cargo onto or removing cargo from the vehicle roof top cargo carrier 16, the support 22 is extended from the carriage 20 by removing the first and second housing pins 75, 76 from the first and second housings 51, 52 (see e.g. FIG. 5). Once the support 22 has been extended a desired length, the first and second housing pins 75, 76 are placed back into the respective first and second housings 51, 52 and the holes of the first and second legs 54, 55 (see e.g. FIG. 10) to fix the support relative to the carriage 22. The carriage pin 77 is removed and the carriage 20 is pulled out or extended from the rear of the frame 18 and thus the rear of the vehicle 10. Once the front of the carriage 22 reaches the end of the frame 18 and thus the first and second pivot brackets, the first and second pivot rods 65, 66 fall into the respective cutouts 81, 83 of the respective pivot brackets 80, 82. At this point, the carriage 22 is free to pivot downwardly with respect to the rear of the frame 18 and thus the rear of the vehicle 10 (see e.g. FIGS. 8, 9). The first and second flanges 85, 86 of the respective first and second pivot brackets 80, 82 prevent the respective first and second pivot rods 65, 66 from coming out of the respective first and second pivot cutouts 81, 83. The wheels 61, 62 of the rear of the frame 18 aid in extending the carriage 20 from the frame 18. FIG. 9 shows the carriage 20 and the support 22 in a fully extended and pivoted position ready for cargo loading (and unloading if cargo was on the carriage 20). First housing pin 75 is shown removed from the first housing 51 to illustrate its tethering. Also shown is a strap 94 and associated strap latch 95 for holding cargo onto the cargo receptacle 24a. Likewise shown is a strap 96 and associated strap latch 97 for holding cargo onto the cargo receptacle 24b.

When retracting the carriage 20 and the support 22, the carriage 20 and the support 22 are raised or pivoted upwardly wherein the front wheels 38, 39 begin to be received in the respective first and second railways of the first and second elongated laterals rails 26, 27. This action lifts the first and second pivot rods 65, 66 from the respective cutouts 81, 83 of the respective first and second pivot brackets 80, 82 and over the respective first and second flanges 85, 86 thereof. The carriage 20 and the support 22 are now free to move forward along the first and second railways until the first and second pivot rods 65, 66 reach the respective first and second stops 63, 64 of the frame 18. The support 22 is then retracted relative to the carriage 20 and the appropriate pins are secured in place.

It should be appreciated that variations of the above-described procedure for loading cargo to and unloading cargo from the vehicle roof top cargo carrier 16 are contemplated.

The present vehicle roof top cargo carrier 16 allows the carriage 20 and thus the support 22 to be easily removed from the frame 16. This provides a remedy where height of the carriage and its cargo receptacles is a concern.

Figure 12:
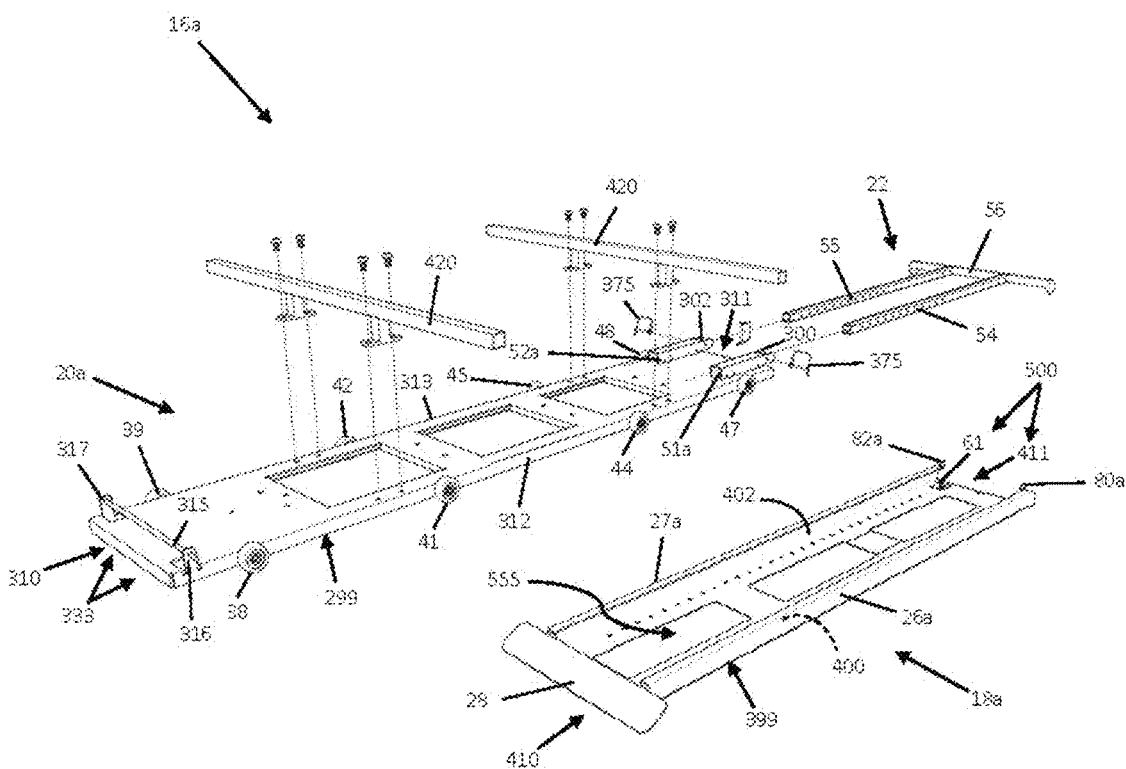
FIG. 12 is an exploded view of another roof top cargo carrier fashioned in accordance with the principles of the present invention.

FIGS. 12-17 depict various illustrations of another exemplary vehicle roof top cargo carrier, generally designated 16a, fashioned in accordance with the principles of the present invention. The vehicle roof top cargo carrier 16a is a variation of the vehicle roof top cargo carrier 16 and thus has the designation "a." Components, features, structures, items and the like of the vehicle roof top cargo carrier 16a that are similar but not identical to the components, features, structures, items and the like of the vehicle roof top cargo carrier 16 are labeled with the designation "a" while components, features, structures, items and the like of the vehicle roof top cargo carrier 16a that are different from the components, features, structures, items and the like of the vehicle roof top cargo carrier 16 are labeled with new, unused callout numbers. Therefore, components, features, structures, items and the like of the vehicle roof top cargo carrier 16a that are the same as the components, features, structures, items and the like of the vehicle roof top cargo carrier 16 (i.e. does not have the designation "a") may or may not be again discussed. As seen in FIG. 12, the vehicle roof top cargo carrier 16a has a frame 18a, a carriage 20a, and the support 22. Various cargo attachment members 420 are attachable to the carriage 20a as clearly illustrated. The frame 18a is attachable to the existing cargo racks 12a, 12b on the roof of a vehicle and defines a raceway 555. The carriage 20a is configured to be movably received in the raceway 555 of the frame 18a. The frame 18a and the carriage 20a are configured to allow the carriage 20a to be positioned generally co-planar with the frame 18a (0°) and into a position generally vertical to the frame 18a (90°) once the carriage 20a has been extended from rear 411 of the frame 18a.

The frame 18a is formed as a single piece, member, or the like of material 399 such as, but not limited to, aluminum, or otherwise fashioned/made into a one-piece frame body 399. Metals other than aluminum may be used as well as other suitable materials such as, but not limited to, plastics. Combinations of materials are also contemplated. The frame 18a has a front 410, a rear 411, a first lateral side/rail 26a, and a second lateral side/rail 27a. A combination air deflector/carriage stop 28 is provided at the front 410 of the frame 18a. The first lateral side 26a defines a first channel 400 on the inside thereof within the raceway 555, while the second lateral side 27a defines a second channel 402 on the inside thereof within the raceway 555.

A pivot structure 500 is provided at the rear 411 of the frame 18a and is configured to co-act with pivot structure 333 of the carriage 20a. The pivot structure 500 includes a first side structure comprising the wheel 60 and pivot boss 80a, and a second side structure comprising the wheel 61 and the pivot 82a. The wheel 60 is situated at the rear 311 of the frame 18a and within the first channel 400, while the wheel 61 is situated at the rear 311 of the frame 18a and within the second channel 402. The pivot structure 500 allows the carriage 20a to be positioned generally co-planar with the frame 18a (0°) and into a position generally vertical to the frame 18a (90°) once the carriage 20a has been extended from rear 411 of the frame 18a.

The carriage 20a is formed as a single piece, member, or the like of material 299 such as, but not limited to, aluminum, or otherwise fashioned/made into a one-piece frame body 299. Metals other than aluminum may be used as well as other suitable materials such as, but not limited to, plastics. Combinations of materials are also contemplated. The carriage 20a has a front 310, a rear 311, a first lateral side 312, and a second lateral side 313. First conveyance members (e.g. wheels 38, 41, 44, 47) are provided along the first lateral side 312, while second conveyance members (e.g. wheels 39, 42, 45, 48) are provided along the second lateral side 313. The first conveyance members/first lateral side are configured for movable reception in the first channel 400, while the second conveyance members/second lateral side are configured for movable reception the in the second channel 402. The pivot structure 333 of the carriage 20a comprises a rod, bar, member, or the like 315 situated proximate the front 310 of the carriage body 299 that extends generally from the first lateral side 312 to the second lateral side 313. The rod 315 is supported at the first lateral side 312 by a first flange 316 and at the second lateral side 313 by a second flange 317.

The carriage 20a also carries the first support bracket 51a located proximate the rear 311 of the body 299 at the first lateral side 312, and the second support bracket 52a located proximate the rear 311 of the body 299 at the second lateral side 313. The first support bracket 51a adjustably movably holds the first leg 54 of the support 22, while the second support bracket 52a adjustably movably holds the second leg 55 of the support 22. Clips 375 are used to fix the position of the first and second legs 54, 55 in the first and second support brackets 51a, 52a in order to fix the length of the support 22 relative to the carriage 20a. The support bracket 51a has a configured end 300 that allows the first leg 54 of the support 22 to be positioned co-planar with the carriage 20a (0°) and into a position generally vertical to the carriage 20a (90°) once the support 22 has been extended from rear 311 of the carriage 20a. The support bracket 52a has a configured end 302 that allows the second leg 55 of the support 22 to be positioned co-planar with the carriage 20a (0°) and into a position generally vertical to the carriage 20a (90°) once the support 22 has been extended from rear 311 of the carriage 20a. This allows the support 22 to be positioned co-planar with the carriage 20a (0°) and into a position generally vertical to the carriage 20a (90°) once the support 22 has been extended from rear 311 of the carriage 20a.

Figure 13:
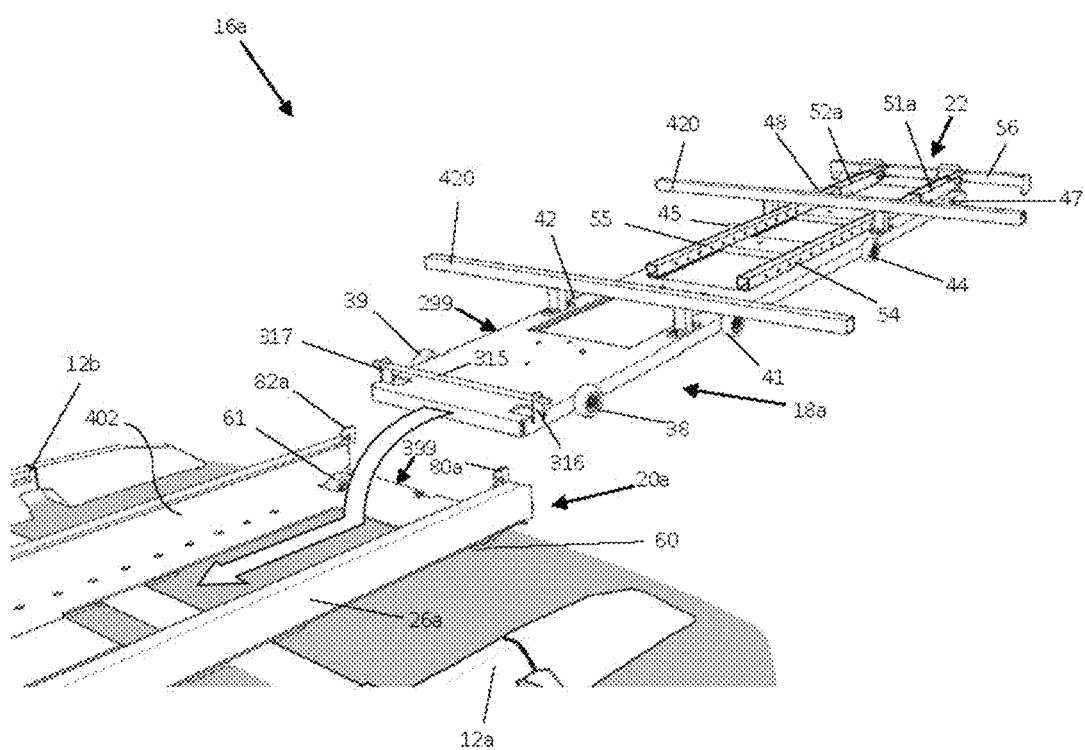
FIG. 13 is a view of a rear portion of a roof top of a vehicle showing reception of the carriage into the frame of the roof top cargo carrier of FIG. 12.
Figure 14:
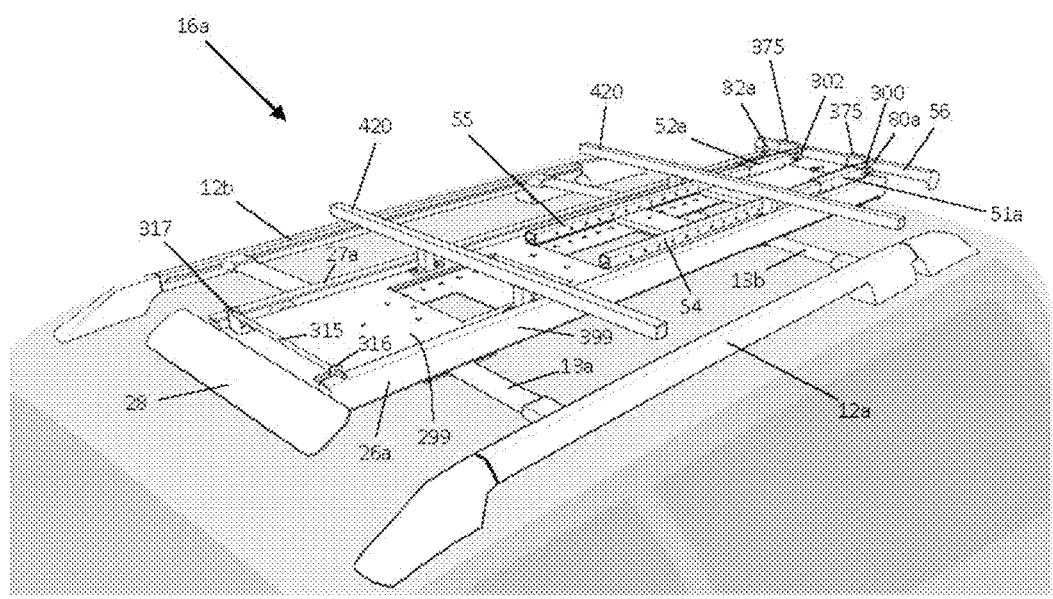
FIG. 14 is a view of the roof top cargo carrier of FIG. 12 mounted on the roof top of a vehicle with the carriage of the roof top cargo carrier fully stowed in the frame of the roof top cargo carrier.
Figure 15:
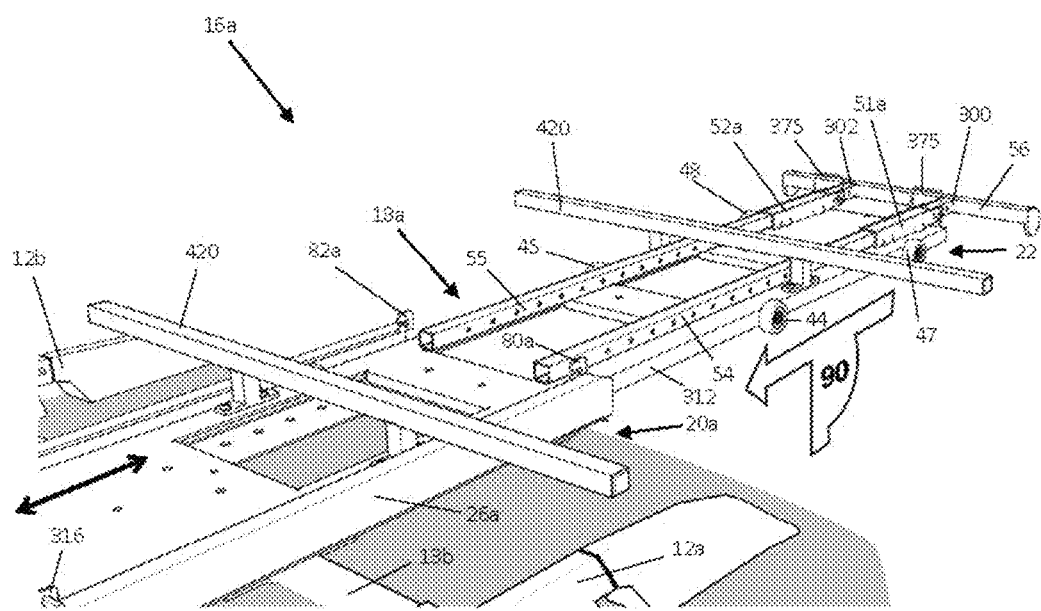
FIG. 15 is a view of the rear portion of the roof top cargo carrier on the roof a vehicle illustrating the extent of pivoting of the carriage of the roof top cargo carrier relative to the roof of the vehicle.
Figure 16:
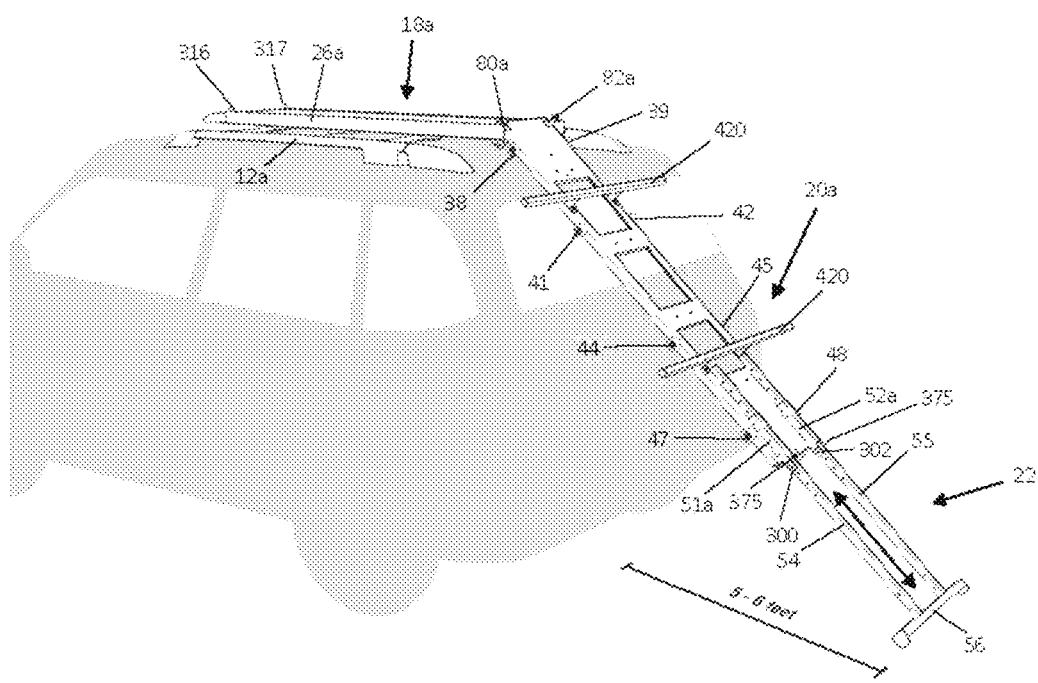
FIG. 16 is a rear view of the vehicle with the roof top cargo carrier in an extended position.
Figure 17:
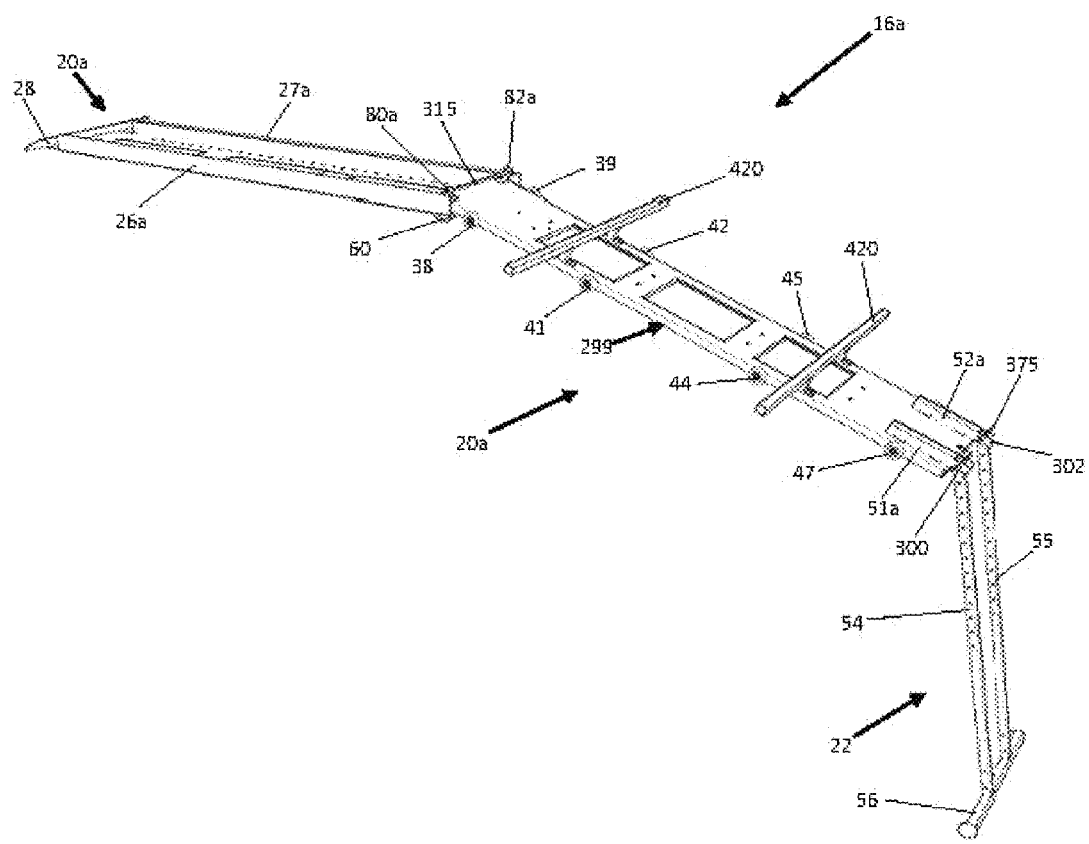
FIG. 17 is a view of the roof top cargo carrier in an extended and horizontal position.

FIG. 13 illustrates how the carriage 20a and the support 22 are received in the frame 18a. FIG. 14 depicts the vehicle roof top cargo carrier 16a in an assembled state on the roof of a vehicle. FIG. 15 illustrates how the carriage 20a pivots 90° relative to the frame 18a. FIG. 16 illustrates how the carriage 20a and the support 22 extend relative to the vehicle. FIG. 17 illustrates how the carriage 20a and the support 22 may be positioned into one of many positions.

The ability of the carriage to be pivoted 90° relative to the frame, and the support to be pivoted 90° relative to the carriage, enables the vehicle roof top cargo carrier 16a to be used for purposes other than holding cargo. For instance, the carriage and support may be used as a "tent pole," support, or the like. Other uses are apparent and/or contemplated.

It should be appreciated that dimensions of the components, structures, and/or features of the present vehicle roof top cargo carrier may be altered as desired within the scope of the present disclosure.

What is claimed is:

1. A vehicle roof top cargo carrier for attachment to existing roof rack members of a vehicle, the vehicle roof top cargo carrier comprising:

a frame having a front end, a rear end, a first side channel extending from proximate the front end of the frame to the rear end of the frame, a second side channel extending from proximate the front end of the frame to the rear end of the frame, a first pivot structure at an intersection of the rear end of the frame and the first side channel, and a second pivot structure at an intersection of the rear end of the frame and the second side channel;

a carriage sized for movable reception in the frame and having a front end, a rear end, a first lateral side with first conveyance members both sized for movable reception along and within the first side channel of the frame, a second lateral side with second conveyance members both sized for movable reception along and within the second side channel of the frame, a pivot structure on the front end of the frame and configured to co-act with the first and second pivot structures of the frame to allow the carriage to pivot from a position generally co-planar with the frame to a position generally vertical to the frame once the carriage has been extended from the rear of the frame, and support brackets situated at the rear end of the frame and each having adjustment structures; and a support having first and second legs slidably received in the support brackets of the carriage and each having cooperating adjustment structures that co-act with the adjustment structures of the support brackets to allow adjustable movement of the support relative to the carriage.

2. The vehicle roof top cargo carrier of claim 1, wherein the support brackets allow the support to pivot from a position generally co-planar with the carriage to a position generally vertical to the carriage once the support has been extended from the rear of the support brackets.

3. The vehicle roof top cargo carrier of claim 1, wherein the frame comprises a single piece.

4. The vehicle roof top cargo carrier of claim 3, wherein the carriage comprises a single piece.

5. The vehicle roof top cargo carrier of claim 1, further comprising:
a combination air deflector and carriage stop situated on the front end of the frame.

6. The vehicle roof top cargo carrier of claim 1, wherein:
the first pivot structure of the frame comprises a first wheel situated in the rear end of the first side channel and a first notch configured to receive a portion of the pivot structure of the carriage to provide a first pivot between the carriage and the frame; and
the second pivot structure comprises a second wheel situated in the rear end of the second side channel and a second notch configured to receive a portion of the pivot structure of the carriage to provide a second pivot between the carriage and the frame.

7. A vehicle roof top cargo carrier for attachment to existing roof rack members of a vehicle, the vehicle roof top cargo carrier comprising:
a one-piece frame having a front end, a rear end, a first side channel extending from proximate the front end of the one-piece frame to the rear end of the one-piece frame, a second side channel extending from proximate the front end of the one-piece frame to the rear end of the one-piece frame, a first pivot structure at an intersection of the rear end of the one-piece frame and the first side channel, and a second pivot structure at an intersection of the rear end of the one-piece frame and the second side channel;
a one-piece carriage sized for movable reception in the one-piece frame and having a front end, a rear end, a first lateral side with first conveyance members both sized for movable reception along and within the first side channel of the one-piece frame, a second lateral side with second conveyance members both sized for movable reception along and within the second side channel of the one-piece frame, a pivot structure on the front end of the one-piece frame and configured to co-act with the first and second pivot structures of the one-piece frame to allow the one-piece carriage to pivot from a position generally co-planar with the one-piece frame to a position generally vertical to the one-piece frame once the one-piece carriage has been extended from the rear of the one-piece frame, and support brackets situated at the rear end of the one-piece frame and each having adjustment structures; and a support having first and second legs slidably received in the support brackets of the one-piece carriage and each having cooperating adjustment structures that co-act with the adjustment structures of the support brackets to allow adjustable movement of the support relative to the one-piece carriage.

8. The vehicle roof top cargo carrier of claim 7, wherein the support brackets allow the support to pivot from a position generally co-planar with the one-piece carriage to a position generally vertical to the one-piece carriage once the support has been extended from the rear of the support brackets.

9. The vehicle roof top cargo carrier of claim 8, wherein:
the first pivot structure of the one-piece frame comprises a first wheel situated in the rear end of the first side channel and a first notch configured to receive a portion of the pivot structure of the one-piece carriage to provide a first pivot between the one-piece carriage and the one-piece frame; and
the second pivot structure comprises a second wheel situated in the rear end of the second side channel and a second notch configured to receive a portion of the pivot structure of the one-piece carriage to provide a second pivot between the one-piece carriage and the one-piece frame.

10. A vehicle roof top cargo carrier comprising:
a one-piece frame having a front end, a rear end, a first side channel extending from proximate the front end of the one-piece frame to the rear end of the one-piece frame, a second side channel extending from proximate the front end of the one-piece frame to the rear end of the one-piece frame, a first pivot structure at the rear end of the one-piece frame in the first side channel, and a second pivot structure at the rear end of the one-piece frame in the second side channel;
a one-piece carriage sized for movable reception in the one-piece frame and having a front end, a rear end, a first lateral side with first conveyance members both sized for movable reception along and within the first side channel of the one-piece frame, a second lateral side with second conveyance members both sized for movable reception along and within the second side channel of the one-piece frame, a pivot structure on the front end of the one-piece frame and configured to co-act with the first and second pivot structures of the one-piece frame to allow the one-piece carriage to pivot from a position generally co-planar with the one-piece frame to a position generally vertical to the one-piece frame once the one-piece carriage has been extended from the rear of the one-piece frame, and support brackets situated at the rear end of the one-piece frame and each having adjustment structures; and
a support having first and second legs slidably received in the support brackets of the one-piece carriage and each having cooperating adjustment structures that co-act with the adjustment structures of the support brackets to allow adjustable movement of the support relative to the one-piece carriage;
the support brackets allow the support to pivot from a position generally co-planar with the one-piece carriage to a position generally vertical to the one-piece carriage once the support has been extended from the rear of the support brackets.

11. The vehicle roof top cargo carrier of claim 10, wherein:
the first pivot structure of the one-piece frame comprises a first wheel situated in the rear end of the first side channel and a first notch configured to receive a portion of the pivot structure of the one-piece carriage to provide a first pivot between the one-piece carriage and the one-piece frame; and the second pivot structure comprises a second wheel situated in the rear end of the second side channel and a second notch configured to receive a portion of the pivot structure of the one-piece carriage to provide a second pivot between the one-piece carriage and the one-piece frame.

\* \* \* \* \*